United States Patent
Yamada

(10) Patent No.: US 10,038,826 B2
(45) Date of Patent: Jul. 31, 2018

(54) COLOR GAMUT CONVERSION DEVICE, COLOR GAMUT CONVERSION METHOD, AND COLOR GAMUT CONVERSION PROGRAM

(71) Applicant: JVC KENWOOD Corporation, Yokohama-shi, Kanagawa (JP)

(72) Inventor: Kunio Yamada, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 36 days.

(21) Appl. No.: 15/432,951

(22) Filed: Feb. 15, 2017

(65) Prior Publication Data
US 2017/0163851 A1 Jun. 8, 2017

Related U.S. Application Data

(63) Continuation of application No. PCT/JP2015/074944, filed on Sep. 2, 2015.

(30) Foreign Application Priority Data

Sep. 24, 2014 (JP) .................................. 2014-194067

(51) Int. Cl.
*G06K 9/00* (2006.01)
*H04N 1/60* (2006.01)
*H04N 1/407* (2006.01)

(52) U.S. Cl.
CPC ......... *H04N 1/6066* (2013.01); *H04N 1/4074* (2013.01); *H04N 1/6005* (2013.01);
(Continued)

(58) Field of Classification Search
CPC ...... H04N 1/6058; H04N 1/60; H04N 1/4074; H04N 1/6005; H04N 1/6008;
(Continued)

(56) References Cited

U.S. PATENT DOCUMENTS

2005/0219574 A1* 10/2005 Ok ....................... H04N 1/6058
358/1.9
2009/0154803 A1* 6/2009 Mizukura ............ H04N 1/6058
382/166
(Continued)

FOREIGN PATENT DOCUMENTS

JP H11-507794 7/1999
JP H11-331622 11/1999
(Continued)

*Primary Examiner* — Li Liu
(74) *Attorney, Agent, or Firm* — Brundidge & Stanger, P.C.

(57) ABSTRACT

A saturation ratio calculation unit calculates a saturation ratio of the saturation of an outer circumference of a color gamut of an input image to the saturation of an outer circumference of a color gamut of an output image. A histogram generation unit generates a histogram in which a plurality of pixels selected as pixels outside the color gamut are counted for each pair of lightness and hue. A magnification determination unit determines, within a range of not less than 1 and not more than the saturation ratio, a magnification by which the chromaticity of the input image to be subjected to the color gamut conversion is to be multiplied for each pair of lightness and hue based on the histogram.

5 Claims, 4 Drawing Sheets

(52) U.S. Cl.
CPC ......... *H04N 1/6008* (2013.01); *H04N 1/6027* (2013.01); *H04N 2201/0084* (2013.01)

(58) Field of Classification Search
CPC ............... H04N 1/6027; H04N 1/6066; H04N 2201/0084; G09G 2340/06
See application file for complete search history.

(56) References Cited

U.S. PATENT DOCUMENTS

| | | | | |
|---|---|---|---|---|
| 2010/0079479 A1* | 4/2010 | Kurokawa | ........... | G09G 3/3655 345/590 |
| 2010/0296731 A1* | 11/2010 | Mizukura | ............ | H04N 1/6058 382/167 |
| 2011/0012920 A1* | 1/2011 | Saigo | .................... | G06T 11/001 345/601 |
| 2011/0110588 A1* | 5/2011 | Xie | ......................... | G06T 5/009 382/167 |
| 2014/0176595 A1* | 6/2014 | Takahashi | ................ | G09G 5/02 345/590 |
| 2015/0179093 A1* | 6/2015 | Yamazaki | ............ | G09G 3/2003 345/600 |
| 2015/0199939 A1* | 7/2015 | Takahashi | ................ | G09G 5/02 345/590 |
| 2015/0237320 A1* | 8/2015 | Takahashi | .............. | H04N 5/265 348/708 |
| 2017/0161882 A1* | 6/2017 | Mantiuk | ................. | G06T 5/007 |
| 2018/0018935 A1* | 1/2018 | Nakanishi | ................ | G09G 5/02 |

FOREIGN PATENT DOCUMENTS

| | | |
|---|---|---|
| JP | 2000-165692 | 6/2000 |
| JP | 2002-359748 | 12/2002 |
| JP | 2003-153027 | 5/2003 |

* cited by examiner

COLOR GAMUT CONVERSION DEVICE, COLOR GAMUT CONVERSION METHOD, AND COLOR GAMUT CONVERSION PROGRAM

CROSS-REFERENCE TO RELATED APPLICATION

This application is a Continuation of International Application No. PCT/JP2015/74944, filed on Sep. 2, 2015, which in turn claims the benefit of Japanese Application. No.2014-194067, filed on Sep. 24, 2014, the disclosures of which Application are incorporated by reference herein.

BACKGROUND

1. Field of the Invention

The present invention relates to a color gamut conversion device, a color gamut conversion method, and a color gamut conversion program for converting a color gamut of a color space.

2. Description of the Related Art

In a general image system, a color space is defined according to the sRGB (standard RGB) standard that is an international standard. Along with recent improvement in instrument performance, a color gamut that is a color expression range tends to expand. For example, the color gamuts of liquid crystal displays using a LED with high color purity of luminescent color as a backlight or those of projectors using a laser light source have become considerably wider as compared with the conventional ones. Under such circumstances, studies on the wide color gamut color system of Super Hi-Vision are being conducted.

In various devices, color gamut conversion for converting a wide color gamut image signal into a narrow color gamut image signal (see, for example, Patent Documents 1 and 2) or color gamut conversion for converting a narrow color gamut image signal into a wide color gamut image signal is performed. Among the latter color gamut conversion, there is a method of linearly expanding a color gamut according to a saturation value or an output color gamut width value (see, for example, Patent Document 3), but there is no process to change the extent of expansion in accordance with lightness or hue. Additionally, if it is attempted to adjust a color gamut for all lightness and all hues with respect to an image acquired by a camera with a narrow color gamut, it is impossible to expand a color gamut that can be expanded, and It is difficult to fully utilize the color gamut.

RELATED ART DOCUMENTS

Patent Documents

[Patent Document 1] Japanese Patent Application Publication No. 2000-165692

[Patent Document 2] Japanese Patent Application Publication No. 2002-359748

[Patent Document 3] Japanese Patent Application Publication No. 2003-153027

[Patent Document 4] Japanese Patent Publication No. 3775752

[Patent Document 5] Japanese Patent Application Publication No. Hei 11 (1999)-331622

There is no information on the color outside a color gamut in the original data of an image acquired by a camera with a narrow color gamut. Therefore, it is impossible to grasp which lightness/hue of which part of an object to be photographed exceeds the color gamut of the camera even if the color outside the color gamut is intended to be estimated and expanded, whereby it is difficult to expand a color gamut close to the actual object. The past technology for expanding color outside a color gamut is based on the premise that information on the color outside the color gamut exists as original data (see, for example, Patent Documents 4 and 5), and hence it has been difficult to extend the color outside the color gamut at the initial stage.

SUMMARY

In order to solve the above problem, a color gamut conversion device of the present embodiment comprises: a saturation function generation unit that generates a saturation of an outer circumference of a color gamut in a color space of an input image as a function for lightness and hue and generates a saturation of an outer circumference of a color gamut in a color space of an output image as a function for lightness and hue; a saturation ratio calculation unit that calculates a saturation ratio of the saturation of the outer circumference of the color gamut of the input image to the saturation of the outer circumference of the color gamut of the output image; an input image acquisition unit that acquires an input image to be subjected to color gamut conversion; a lightness/chromaticity acquisition unit that acquires, in a pixel unit, lightness and chromaticity of a predetermined scene from a measurement device capable of measuring lightness and chromaticity; an out-of-gamut pixel selection unit that selects a pixel whose acquired chromaticity exists outside the color gamut of the color space of the input image; a hue calculation unit that calculates a hue of each pixel selected as the pixel outside the color gamut, from the lightness and chromaticity of the each pixel; a histogram generation unit that generates a histogram in which a plurality of pixels selected as the pixels outside the color gamut are counted for each pair of lightness and hue; a magnification determination unit that determines, within a range of not less than 1 and not more than the saturation ratio, a magnification by which the chromaticity of the input image to be subjected to the color gamut conversion is to be multiplied for each pair of lightness and hue based on the histogram; a color space conversion unit that calculates lightness and hue of the each pixel of the input image to be subjected to the color gamut conversion; a chromaticity expansion unit that multiplies the chromaticity of the target pixel of the input image to be subjected to the color gamut conversion by a magnification in accordance with the pair of the lightness and the hue of the target pixel; and a color space inverse conversion unit that converts the image whose color gamut was expanded into an image with the original color space.

It is to be noted that arbitrary combinations of the above constituent elements and modes obtained by converting the expressions of the present invention among methods, apparatuses, systems, recording media, computer programs, etc., are also effective as the aspects of this present embodiments.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

The invention will now be described by reference to the preferred embodiments. This does not intend to limit the scope of the present invention, but to exemplify the invention.

Figure 1:
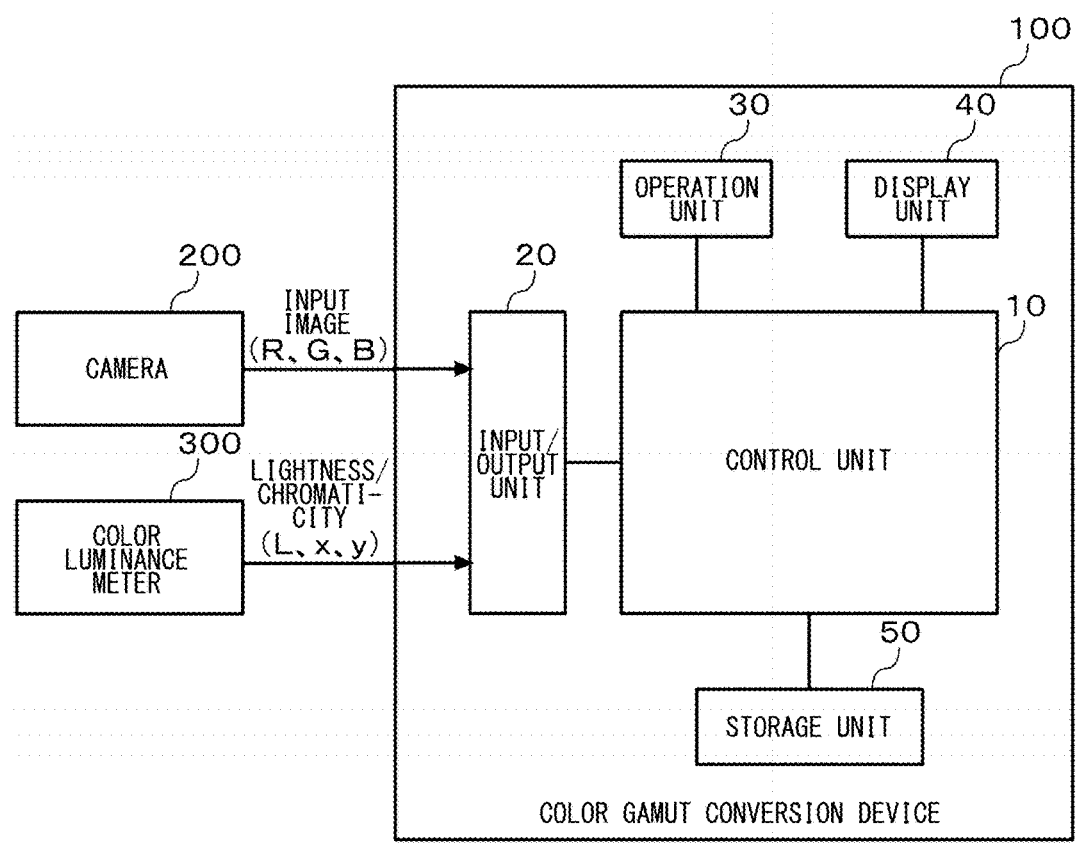
FIG. 1 is a block diagram for explaining a color gamut conversion device according to an embodiment of the present invention.

FIG. 1 is a block diagram for explaining a color gamut conversion device 100 according to an embodiment of the present invention. The color gamut conversion device 100 includes a control unit 10, an input/output unit 20, an operation unit 30, a display unit 40, and a storage unit 50. The color gamut conversion device 100 can be constituted, for example, by a PC. A camera 200 outputs a captured image signal to the control unit 10 via the input/output unit 20. The camera 200 and the color gamut conversion device 100 may be connected by a wired cable such as a USB cable or may be connected by wireless communication such as a wireless LAN or short-distance wireless communication. Further, an image signal captured via a recording medium may be input to the color gamut conversion device 100.

In the present embodiment, an image signal captured by the camera 200 becomes an image signal to be subjected to the color gamut conversion. In the example described below, the color gamut of an image signal captured by the camera 200 is defined as a color gamut of sRGB, and the expanded color gamut is defined as a color gamut of Super Hi-Vision according to the ITU-R BT. 2020 standard. A color gamut conversion method according to the embodiment can also be applied to color gamut conversion between other color spaces, such as the conversion from sRGB to Adobe RGB.

A color luminance meter 300 measures, in a pixel unit, the lightness/chromaticity of a scene corresponding to a scene captured by the camera 200, and outputs the measured lightness/chromaticity to the control unit 10 via the input/output unit 20. The color luminance meter 300 cannot detect the RGB value of each pixel, but detects the lightness/chromaticity of each pixel. The color luminance meter 300 has spectral responsivity similar to a CIE 1931 color matching function that is regarded as the sensitivity of human eyes. Accordingly, the color outside the color gamut of the camera 200 can also be detected. In the present embodiment, the same scene is captured or measured simultaneously by using the camera 200 and the color luminance meter 300 in combination, and it is based on expanding the color gamut of an image captured by the camera 200 based on the data measured by the color luminance meter 300. However, it is also permitted to expand the color gamut by capturing or measuring similar scenes temporally and/or spatially distant by the camera 200 and the color luminance meter 300.

Figure 2:
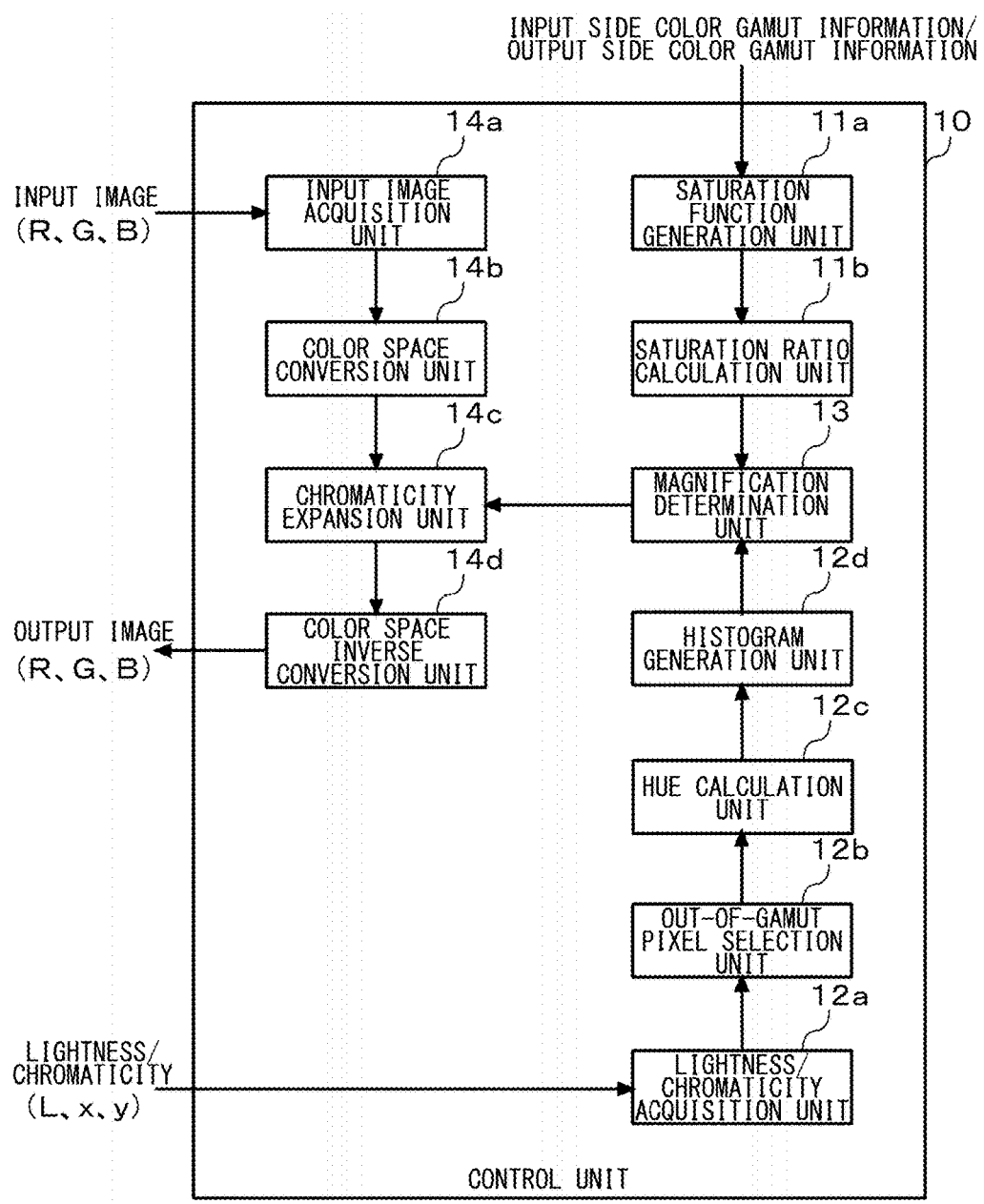
FIG. 2 is a block diagram illustrating a configuration of a control unit in FIG. 1.

FIG. 2 is a block diagram illustrating a configuration of the control unit 10 in FIG. 1. The control unit 10 includes a saturation function generation unit 11a, a saturation ratio calculation unit 11b, a lightness/chromaticity acquisition unit 12a, an out-of-gamut pixel selection unit 12b, a hue calculation unit 12c, a histogram generation unit 12d, a magnification determination unit 13, an input image acquisition unit 14a, a color space conversion unit 14b, a chromaticity expansion unit 14c, and a color space inverse conversion unit 14d. These functions can be achieved by cooperation of hardware resources and software resources, or only by hardware resources. A processor, a ROM, a RAM, and other LSIs can be used as the hardware resources. Programs such as an operating system and an application can be used as the software resources.

The saturation function generating unit 11a generates the saturation of the outer circumference of a color gamut in the color space (sRGB in the present embodiment) of an input image as a function for lightness/hue. The saturation function generation unit 11a also generates the saturation of the outer circumference of a color gamut in the color space of an output image (Super High-Vision in the present embodiment) as a function for lightness/hue. The saturation ratio calculation unit 11b calculates a ratio (hereinafter, referred to as a saturation ratio p) of the saturation function of the outer circumference of the color gamut of an input image to the saturation function of the outer circumference of the color gamut of an output image.

The lightness/chromaticity acquisition unit 12a acquires, in a pixel unit, the lightness/chromaticity of a scene corresponding to an input image from the color luminance meter 300. The out-of-gamut pixel selection unit 12b selects, of all the pixels acquired by the lightness/chromaticity acquisition unit 12a, a pixel whose chromaticity exists outside the color gamut of the color space of an input image. The hue calculation unit 12c calculates the hue of each selected pixel from the lightness/chromaticity of the each selected pixel. The histogram generation unit 12d generates a histogram in which a plurality of pixels selected as the pixels existing outside the color gamut are counted for each pair of lightness/hue.

The magnification determination unit 13 determines, for each pair of lightness/hue based on the generated histogram, a magnification m, by which the chromaticity of an input image is to be multiplied, within the range of ($1 \le m \le p$). For example, the magnification determination unit 13 determines a magnification m for a pair of lightness/hue whose histogram frequency is larger than or equal to a set value to be a value within the range of ($1 < m \le p$), and a magnification m of a pair of lightness/hue whose histogram frequency is less than the set value to be 1.

The above set value is a value for determining whether it is a pair of lightness/hue within the color gamut of the color space of an input image or a pair of lightness/hue outside the color gamut thereof. That is, it is a value for classifying a pair of lightness/hue to be subjected to hue expansion and a pair of lightness/hue not to be subjected thereto. For example, if the frame of scenes captured or measured by the camera 200 and the color luminance meter 300 are perfectly matched and the color luminance meter 300 is an ideal one, the above set value is set to 1. Under this condition, it can be determined that a pair of lightness/hue in which even one pixel exists is out of the color gamut. Actually, the above set value is determined according to the specification of the color luminance meter 300, such as the field angle thereof. When a general color luminance meter 300 is used, it is set, for example, to 20 to 30 pixels.

A fixed value (e.g., 1.2 to 1.3) may be set as the magnification m for a pair of lightness/hue whose histogram frequency is larger than or equal to the set value, or a value that a user specifies by trial and error while watching an image to be subjected to color gamut expansion may be set with the image being displayed on the display unit 40.

The input image acquisition unit 14a acquires an RGB input image from the camera 200. The color space conversion unit 14b calculates the lightness/hue of each pixel by converting the acquired image of RGB color space into an image of L*a*b* color space. The chromaticity expansion unit 14c multiplies the chromaticity of a target pixel of an input image by the magnification m in accordance with the pair of lightness/hue of the target pixel, the magnification m having been determined by the magnification determination unit 13. The color space inverse conversion unit 14d converts the image of L*a*b* color space whose color gamut was expanded into an image of the original RGB color space.

Figure 3:
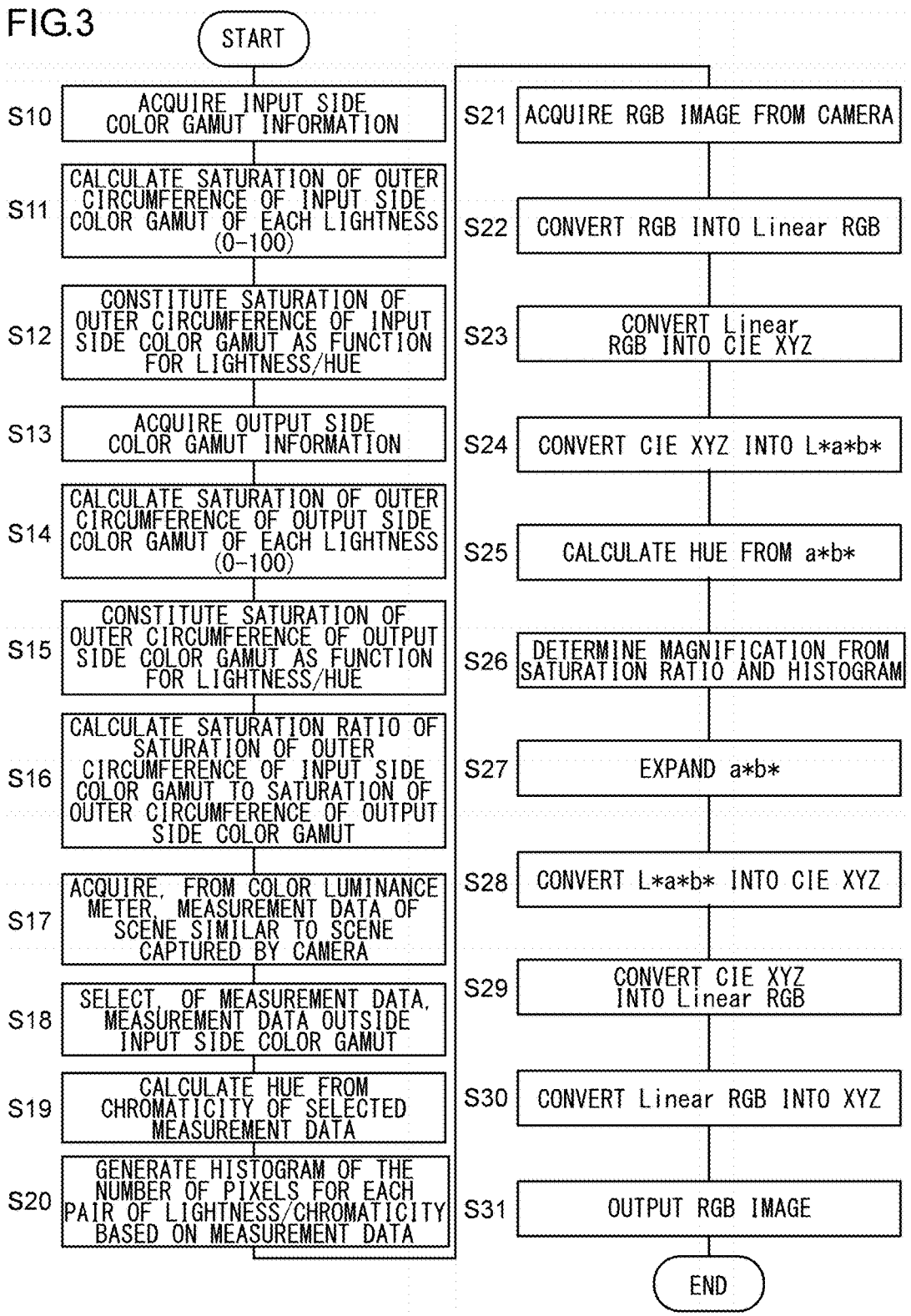
FIG. 3 is a flowchart for explaining details of a color gamut conversion method using the color gamut conversion device of FIG. 1.

FIG. 3 is a flowchart for explaining details of a color gamut conversion method using the color gamut conversion device of FIG. 1. A user inputs, from the operation unit 30, the color gamut of the color space of an input image (hereinafter, referred to as an input side color gamut) with the coordinates of a CIE xy chromaticity diagram. Usually, the coordinates of three RGB points are designated. The saturation function generation unit 11a acquires the coordinates of three RGB points as input side color gamut information (S10). In the present embodiment, it is assumed that the input side color gamut is a triangle. For example, when sRGB under a D 65 light source is set as an input side color gamut, an R point (0.640, 0.330), a G point (0.300, 0.600), and a B point (0.150, 0.060) are designated.

Figure 4:
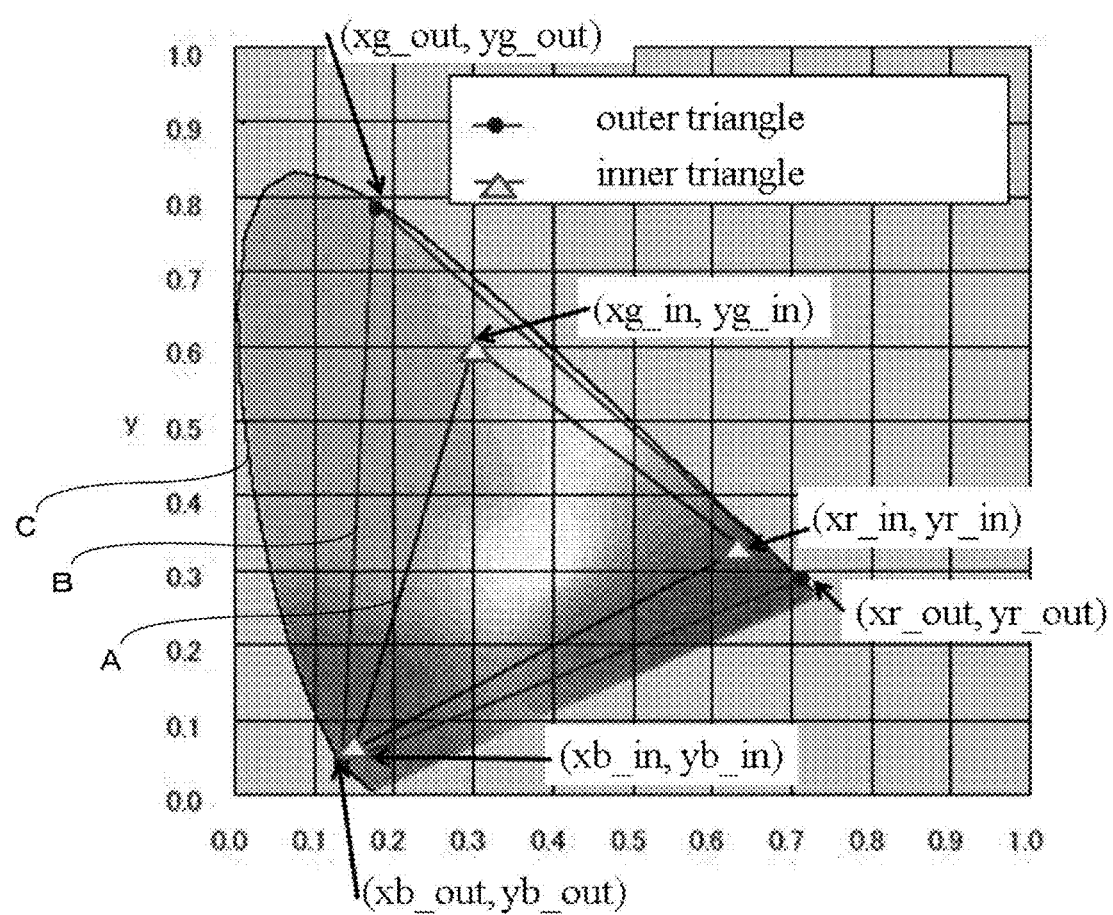
FIG. 4 is a CIE xy chromaticity diagram in which an input side color gamut and an output side color gamut are plotted.

FIG. 4 is a CIE xy chromaticity diagram in which input side color gamuts and output side color gamuts are plotted. The above R point (0.640, 0.330), G point (0.300, 0.600), and B point (0.150, 0.060) are equivalent to the (xr_in, yr_in), (xg_in, yg_in), and (xr_in, yg_in) of the inner triangle A in FIG. 4.

The saturation function generation unit 11a calculates a saturation C of the outer circumference of an input side color gamut with respect to the lightness L* of 0 to 100 (S11). Hereinafter, specific description will be made. First, the equations of the straight lines on each side of the inner triangle A are obtained. Next, the each side is divided into, for example, 1000 points, and z relative to the xy coordinate of each point is calculated by using the following equation (1). The lightness L* is expressed in integer units of 0 to 100, and Y is calculated by using the following equations (2) and (5). At this time, X and Z are calculated by using the following equations (8) and (9). Chromaticities a* and b* are calculated by using the following equations (11) to (14) based on the calculated tristimulus values X, Y, and Z. The length of a vector whose components are the chromaticities a* and b* becomes the saturation C.

$$z = 1 - x - y \quad (1)$$

$$Y = fy^{\wedge}3 * Yn \text{ (in the case of } fy > 6/29), \text{ and } Y = (3/29)^{\wedge}3 * (116fy - 16)Yn \text{ (in the case of } fy < 6/29) \quad (2)$$

$$X = fx^{\wedge}3 * Xn \text{ (in the case of } fx > 6/29), \text{ and } X = (3/29)^{\wedge}3 * (116fx - 16)Xn \text{ (in the case of } fx < 6/29) \quad (3)$$

$$Z = fz^{\wedge}3 * Zn \text{ (in the case of } fz > 6/29), \text{ and } Z = (3/29)^{\wedge}3 * (116fz - 16)Zn \text{ (in the case of } fz < 6/29) \quad (4)$$

$$fy = ((L^*) + 16)/116 \quad (5)$$

$$fx = fy + ((a^*)/500) \quad (6)$$

$$fz = fy - ((b^*)/200) \quad (7)$$

$$X = x * Y/y \quad (8)$$

$$Z = z * Y/y \quad (9)$$

$$(L^*) = 116 f(Y/Yn) - 16 \quad (10)$$

$$(a^*) = 500 [f(X/Xn) - f(Y/Yn)] \quad (11)$$

$$(b^*) = 200 [f(Y/Yn) - f(Z/Zn)] \quad (12)$$

$$f(t) = t^{\wedge}(1/3) \text{ (in the case of } t > (6/29)^{\wedge}3 = 0.008856) \quad (13)$$

$$f(t) = [(29/3)^{\wedge}3 t + 16]/116 \text{ (in the case of others)} \quad (14)$$

Under a D65 light source, Xn=95.045, Yn=100, and Zn=108.892.

The saturation function generation unit 11a constitutes the saturation C of the outer circumference of an input side color gamut as a function for the lightness L and a hue h (S12). Hereinafter, specific description will be made. First, a hue h' is calculated by using the following equation (15) with respect to the data of the 1,000 points of each lightness obtained in the step S11, and the hue h is derived by performing frequency conversion on the hue h'.

$$h' = a \tan(b^*/a^*) \quad \text{Formula (15)}$$

wherein the atan is an inverse tangent.

The lightness L* and the saturation C, occurring when the hue h is closest to an integer, are incorporated into an array. By going around all the sides, an array of the lightness L* and the saturation C with the hue h of 0° to 360° is obtained. By performing this processing while varying the lightness L*, the saturation C forms an array in which the lightness L* and the hue h are two variables.

A user inputs, from the operation unit 30, the color gamut of the color space of an output image (hereinafter, referred to as an output side color gamut) to the coordinates of a CIE xy chromaticity diagram. The saturation function generation unit 11a acquires the coordinates of three RGB points as output side color gamut information (S13). In the present embodiment, it is assumed that the output side color gamut is also a triangle. For example, when a color gamut of Super Hi-vision is set as the output side color gamut, an R point (0.7140, 0.2859), a G point (0.1702, 0.7965), and a B point (0.1314, 0.0459) are designated.

The above R point (0.7140, 0.2859), G point (0.1702, 0.7965), and B point (0.1314, 0.0459) are equivalent to the (xr_out, yr_out), (xg_out, yg_out), and (xr_out, yg_out) of the outer triangle B in FIG. 4. The horseshoe-shaped area C shows a color gamut that can be recognized by human eyes.

The saturation function generation unit 11a calculates a saturation C of the outer circumference of an output side color gamut with respect to the lightness L* of 0 to 100 (S14). The same processing as that of the above step S11 is performed. The saturation function generation unit 11a constitutes the saturation C of the outer circumference of an output side color gamut as a function for the lightness L and the hue h (S15). The same processing as that of the above step S12 is performed. The saturation ratio calculation unit 11b calculates the saturation ratio p by dividing the saturation of the outer circumference of the output side color gamut calculated in the step S14 with the saturation of the outer circumference of the input side color gamut calculated in the step S12 (S16).

The lightness/chromaticity acquisition unit 12a acquires, in a pixel unit, the measurement data (specifically, lightness L*, chromaticities x, y) of a scene similar to the scene captured by the camera 200 from the color luminance meter 300 (S17). The out-of-gamut pixel selection unit 12b selects, of the acquired measurement data, measurement data outside the input side color gamut (S18). Hereinafter, specific description will be made. Of the measurement data, only measurement data of pixels whose x, y coordinate values of the chromaticity exist outside the input side color gamut are selected. That is, only the measurement data located outside the inner triangle A in FIG. 4 are selected. By this selection, only the pixels, having color data that were not able to be acquired as outside the color gamut by the camera 200, are selected.

A straight line connecting the point R (xr_in, yr_in) and the point G (xg_in, yg_in) in FIG. 4 is obtained. A slope a_rg=(yr_in−yg_in)/(xr_in−xg_in) and an intercept b_rg=yr_in−a_rg*xr_in are calculated, and a straight line connecting the points R and G is derived as a linear function (y=a_rg*x+b_rg).

Similarly, a straight line connecting the point G (xg_in, yg_in) and the point B (xb_in, yb_in) is obtained. A slope a_gb=(yg_in−yb_in)/(xg_in−xb_in) and an intercept b_gb = yg_in−a_gb*xg_in are calculated, and a straight line connecting the points G and B is derived as a linear function (y=a_gb*x+b_gb).

Similarly, a straight line connecting the point B (xb_in, yb_in) and the point R (xr_in, yr_in) is obtained. A slope a_br=(yb_in−yr_in)/(xb_in−xr_in) and an intercept b_br=yb_in−a_br*xb_in are calculated, and a straight line connecting the points B and R is derived as a linear function (y=a_br*x+b_br).

Because the measurement data to be selected are ones located in an area outside the triangle formed by these three straight lines, the measurement data located in the area that satisfies (y>a_rg*x+b_rg)∩(y>a_gb*x+b_gb)∩(y<a_br*x+b_br).

The hue calculating unit 12c calculates the hue h from the chromaticities x and y of the measurement data selected as outside the color gamut (S19). Hereinafter, specific description will be made. The tristimulus values X, Y, and Z are calculated from the measurement data (lightness L*, chromaticities x, y) selected as outside the color gamut by using the above equations (1), (2), (5), (8), and (9). The chromaticities a* and b* are calculated from the tristimulus values X, Y, and Z by using the above equations (11) to (14), and the hue h is obtained by using the above equation (15). Also herein, the hue h on which frequency conversion was performed is obtained.

The histogram generation unit 12d generates a histogram of the number of pixels for each pair of the lightness and the hue, by using the measurement data selected as outside the color gamut as a population (S20). Specifically, how much data of each pair of the lightness L* and the hue h exist is counted. Because the measurement data is acquired in a pixel unit, a histogram of the number of pixels for the pair of the lightness L* and the hue h is generated. As a result, it can be known, of the color data of the whole subject, how much color data deviating from the input side color gamut exist and what kind of hue data they are.

The input image acquisition unit 14a acquires an RGB image signal from the camera 200 (S21). This RGB image signal is to be subjected to the color gamut expansion. The color space conversion unit 14b converts the image signal of RGB color space into an image signal of linear RGB color space (S22). That is, general normalization processing and inverse gamma conversion processing are performed on the image signal of RGB color space.

The color space conversion unit 14b converts the image signal of linear RGB color space into an image signal of CIE XYZ color space (S23). For example, when the input side color gamut is a color gamut of sRGB color space under a D65 light source, the above conversion is performed by using the following equations (16) to (18).

$$X=100*(0.4124*R+0.3576*G+0.1805*B) \quad (16)$$

$$Y=100*(0.2126*R+0.7152*G+0.0722*B) \quad (17)$$

$$Z=100*(0.0193*R+0.1192*G+0.9505*B) \quad (18)$$

The color space conversion unit 14b converts the image signal of CIE XYZ color space into an image signal of L*a*b* color space (S24). The chromaticity expansion unit 14c calculates the hue h from the derived chromaticities a* and b* by using the above equation (15) (S25). Also herein, the hue h on which frequency conversion was performed is calculated.

The magnification determination unit 13 determines a magnification for expanding the chromaticities a* and b* of each pixel of the input image signal, based on the saturation ratio p derived in the step S16 and the histogram derived in the step S20 (S26). The magnification m for the pair of the lightness L* and the hue h whose histogram frequency is larger than or equal to the above set value is set to be 1≤m≤p. The magnification for the pair of the lightness L* and the hue h whose histogram frequency is at least 0 is limited to 1. Thereby, when the color gamut of a subject is within the color gamut of the camera 200, the color gamut is not expanded, and when there is an object outside the color gamut, it becomes possible to expand in accordance with the color.

The chromaticity expansion unit 14c expands a color gamut by multiplying the chromaticities a* and b* of each pixel of an input image signal by the magnification m determined in the step S26 (S27). The color space inverse conversion unit 14d converts the image signal of L*a*b* color space whose color gamut was expanded into an image signal of CIE XYZ color space by using the above equations (10) to (14) (S28).

The color space inverse conversion unit 14d converts the image signal of CIE XYZ color space into an image signal of linear RGB color space (S29). For example, when the output side color gamut is a color gamut of Super Hi-Vision, the above conversion is performed by using the following equations (20) to (22).

$$R=0.01*(1.719307*X-0.356741*Y-0.254701*Z) \quad (20)$$

$$G=0.01*(-0.637302*X+1.591579*Y+0.012991*Z) \quad (21)$$

$$B=0.01*(0.017116*X-0.043076*Y+0.942840*Z) \quad (22)$$

The color space inverse conversion unit 14d converts the image signal of linear RGB color space into an image signal of RGB color space (S30). That is, general gamma conversion processing and constant multiplication processing (in the case, for example, of 8 bits, 255 times) are performed on the image signal of linear RGB color space. The color space inverse conversion unit 14d outputs the image signal of RGB color space as an RGB image signal whose color gamut was expanded (S31).

According to the present embodiment, a magnification m for expanding saturation can be determined in accordance with lightness/hue by designating in advance an input side color gamut and an output side color gamut with the coordinates of a CIE xy chromaticity diagram, whereby effective use of a color gamut can be guaranteed, as described above. Further, a histogram of the lightness/hue of the colors exceeding the color gamut of the camera 200 is generated by using the color luminance meter 300 in combination to measure the lightness/hue, and based on the result, the magnification m for expanding saturation is controlled, focusing on the hue in which the colors outside the color gamut exist. This makes it possible to expand a color gamut close to the real one. That is, a color gamut can be expanded: by using the lightness/hue of an image captured by the camera 200 and the data measured by the color luminance meter 300 in combination; and by specifying the color of the lightness/hue deviating from the color gamut of the camera 200, thereby allowing an image with color close to the actual one to be presented.

The width of saturation is not uniform and varies according to lightness and/or hue. Therefore, more optimized and more efficient color gamut expansion can be achieved by analyzing the lightness/hue of an image captured by the camera 200 and by multiplying the saturation by the magnification m in accordance with the lightness/hue. That is, an image signal acquired in a narrow color gamut on an input side can be appropriately mapped, in a way close to the actual color as much as possible, to a wider color gamut on an output side in accordance with the hue.

The present invention has been described above based on an embodiment. This embodiment is intended to be illustrative only, and it will be obvious to those skilled in the art that various modifications to combinations of these constituting elements and processes could be developed and that such modifications are also within the scope of the present invention.

As a simple example, it can be considered that, with respect to a magnification determination function based on a histogram and the saturation ratio p, the magnification m of 1≤m<p is adopted not only for a pair of specific lightness/hue whose histogram frequency is not less than 1, but also for a surrounding pair of lightness/hue whose histogram frequency is 0. Additionally, the setting and calculation of a color gamut are performed on an xy chromaticity diagram in the above embodiment, but essentially the same processing can be performed even on a u"v" chromaticity diagram, etc.

What is claimed is:

1. A color gamut conversion device comprising:
    a saturation function generation unit that generates a saturation of an outer circumference of a color gamut in a color space of an input image as a function for lightness and hue and generates a saturation of an outer circumference of a color gamut in a color space of an output image as a function for lightness and hue;
    a saturation ratio calculation unit that calculates a saturation ratio of the saturation of the outer circumference of the color gamut of the input image to the saturation of the outer circumference of the color gamut of the output image;
    an input image acquisition unit that acquires an input image to be subjected to color gamut conversion;
    a lightness/chromaticity acquisition unit that acquires, in a pixel unit, lightness and chromaticity of a predetermined scene from a measurement device capable of measuring lightness and chromaticity;
    an out-of-gamut pixel selection unit that selects a pixel whose acquired chromaticity exists outside the color gamut of the color space of the input image;
    a hue calculation unit that calculates a hue of each pixel selected as the pixel outside the color gamut, from the lightness and the chromaticity of each selected pixel;
    a histogram generation unit that generates a histogram in which a plurality of pixels selected as the pixels outside the color gamut are counted for each pair of lightness and hue;
    a magnification determination unit that determines, within a range of not less than 1 and not more than the saturation ratio, a magnification by which the chromaticity of the input image to be subjected to the color gamut conversion is to be multiplied for each pair of lightness and hue based on the histogram;
    a color space conversion unit that calculates lightness and hue of each selected pixel of the input image to be subjected to the color gamut conversion;
    a chromaticity expansion unit that multiplies the chromaticity of the target pixel of the input image to be subjected to the color gamut conversion by a magnification in accordance with the pair of the lightness and the hue of the target pixel; and
    a color space inverse conversion unit that converts the image whose color gamut was expanded into an image with the original color space.

2. The color gamut conversion device according to claim 1, wherein
    the magnification determination unit determines a magnification for a pair of lightness and hue whose histogram frequency is larger than or equal to a set value to be 1<m≤the saturation ratio, and determines a magnification for a pair of lightness and hue whose histogram frequency is less than the set value to be 1.

3. The color gamut conversion device according to claim 1, wherein
    the measurement device is a color luminance meter.

4. A color gamut conversion method comprising the steps of:
    generating a saturation of an outer circumference of a color gamut in a color space of an input image as a function for lightness and hue and generating a saturation of an outer circumference of a color gamut in a color space of an output image as a function of lightness and hue;
    calculating a saturation ratio of the saturation of the outer circumference of the color gamut of the input image to the saturation of the outer circumference of the color gamut of the output image;
    acquiring an input image to be subjected to color gamut conversion;
    acquiring, in a pixel unit, lightness and chromaticity of a predetermined scene from a measurement device capable of measuring lightness and chromaticity;
    selecting a pixel whose acquired chromaticity exists outside the color gamut of the color space of the input image;
    calculating a hue of each pixel selected as the pixel outside the color gamut, from the lightness and the chromaticity of each selected pixel;
    generating a histogram in which pixels selected as the pixels outside the color gamut are counted for each pair of lightness and hue;
    determining, within the range of not less than 1 and not more than the saturation ratio, a magnification by which the chromaticity of the input image to be subjected to the color gamut conversion is to be multiplied for each pair of lightness and hue based on the histogram;
    calculating lightness and hue of each selected pixel of the input image to be subjected to the color gamut conversion;
    multiplying the chromaticity of the target pixel of the input image to be subjected to the color gamut conversion by a magnification in accordance with the pair of the lightness and the hue of the target pixel; and
    converting the image whose color gamut was expand into an image with the original color space.

5. A non-transitory computer-readable medium storing a color gamut conversation program that, in response to execution, causes a computer to perform operations comprising:

generating a saturation of an outer circumference of a color gamut in a color space of an input image as a function for lightness and hue and generating a saturation of an outer circumference of a color gamut in a color space of an output image as a function of lightness and hue;

calculating a saturation ratio of the saturation of the outer circumference of the color gamut of the input image to the saturation of the outer circumference of the color gamut of the output image;

acquiring an input image to be subjected to color gamut conversion;

acquiring, in a pixel unit, lightness and chromaticity of a predetermined scene from a measurement device capable of measuring lightness and chromaticity;

selecting a pixel whose acquired chromaticity exists outside the color gamut of the color space of the input image;

calculating a hue of each pixel selected as the pixel outside the color gamut, from the lightness and the chromaticity of each selected pixel;

generating a histogram in which pixels selected as the pixels outside the color gamut are counted for each pair of lightness and hue;

determining, within the range of not less than 1 and not more than the saturation ratio, a magnification by which the chromaticity of the input image to be subjected to the color gamut conversion is to be multiplied for each pair of lightness and hue based on the histogram;

calculating lightness and hue of each selected pixel of the input image to be subjected to the color gamut conversion;

multiplying the chromaticity of the target pixel of the input image to be subjected to the color gamut conversion by a magnification in accordance with the pair of the lightness and the hue of the target pixel; and converting the image whose color gamut was expanded into an image with the original color space.

\* \* \* \* \*